United States Patent [19]

Goettker

[11] Patent Number: 5,551,530
[45] Date of Patent: Sep. 3, 1996

[54] PRESSURE REDUCING CAP FOR A LIQUID LUBRICANT-FILLED WHEEL HUB

[76] Inventor: Bernhardt P. Goettker, 1031 Gale St., Escondido, Calif. 92027

[21] Appl. No.: 444,826

[22] Filed: May 17, 1995

[51] Int. Cl.$^6$ .................................................. F16N 11/04
[52] U.S. Cl. .................... 184/45.2; 184/45.1; 301/108.2; 301/108.3
[58] Field of Search ..................................... 184/5.1, 45.1, 184/45.2; 301/108.2, 108.3

[56] References Cited

U.S. PATENT DOCUMENTS

| | | | |
|---|---|---|---|
| 3,077,948 | 2/1963 | Law | 184/45.1 |
| 3,785,706 | 1/1974 | Vangalis | 184/45.1 |
| 3,955,852 | 5/1976 | De Puydt et al. | 184/45.1 |
| 4,058,185 | 11/1977 | Ploger | 184/45.1 |
| 4,106,816 | 8/1978 | August | 184/5.1 |
| 5,054,859 | 10/1991 | Goettker | 301/108 R |
| 5,303,800 | 4/1994 | Persson | 184/5.1 |

FOREIGN PATENT DOCUMENTS 143156  5/1920  United Kingdom ................. 184/45.1

OTHER PUBLICATIONS

Liqua-Lube Information Pamphlet, Liqua-Lube Inc., Sep. 1994.

Primary Examiner—Thomas E. Denion
Attorney, Agent, or Firm—Rodney F. Brown

[57] ABSTRACT

A hub-spindle assembly is provided having a spindle and a hub with forward and rearward apertures and an axial passageway extending therebetween. The spindle is received through the rearward aperture into the axial passageway and a wheel bearing is conventionally positioned between the spindle and interior surface of the axial passageway. A cap is fitted into the forward aperture of the axial passageway having a hollow open-ended barrel and a piston slidably positioned therein. The piston and barrel in combination define an interior cavity of the cap. The interior cavity and axial passageway form a continuous lubricant chamber having a fluid volume that is filled in its entirety with a liquid lubricant, thereby fully immersing the wheel bearing housed in the lubricant chamber. When the hub-spindle assembly is in rotational operation, the liquid lubricant typically expands due to heat buildup. Accordingly, a spring positioned between the barrel and piston operates in cooperation with the slidable piston enabling expansion of the lubricant chamber to reduce the fluid pressure within the lubricant chamber without the loss of liquid lubricant.

20 Claims, 2 Drawing Sheets

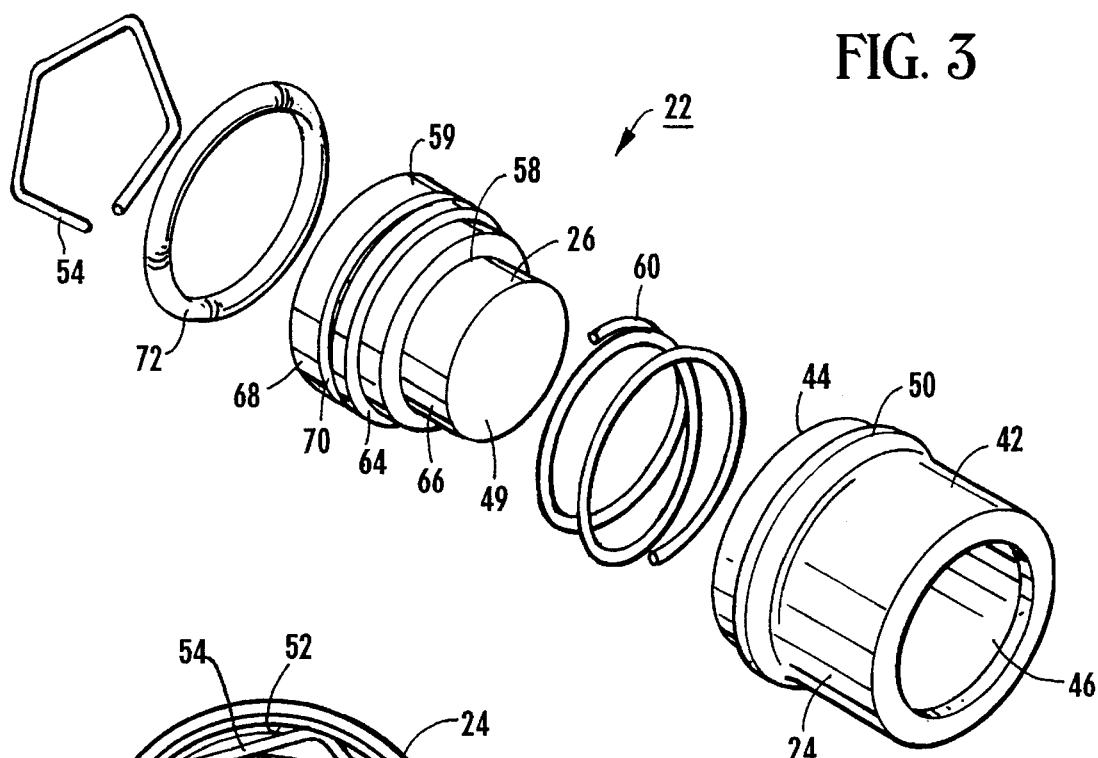
FIG. 3
FIG. 4
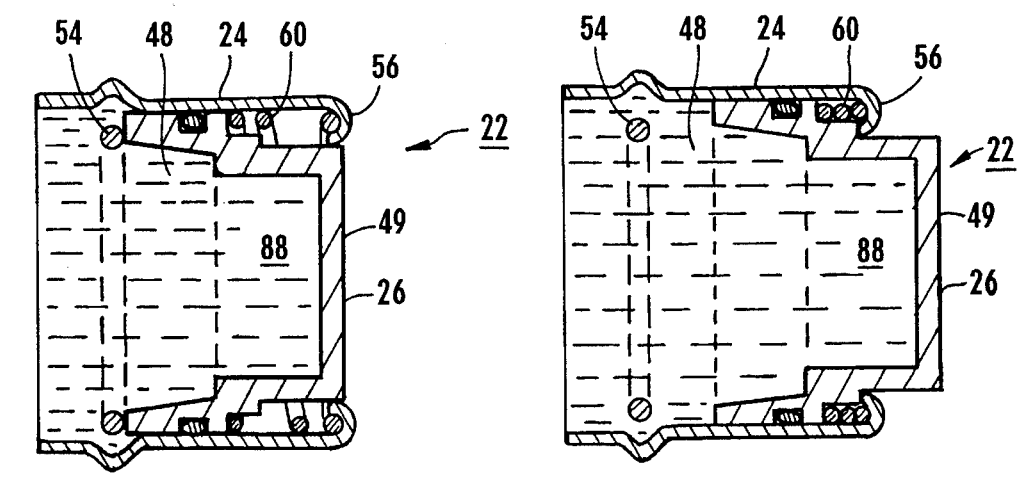
FIG. 5A FIG. 5B

5,551,530

PRESSURE REDUCING CAP FOR A LIQUID LUBRICANT-FILLED WHEEL HUB

TECHNICAL FIELD

The present invention relates generally to a hub-spindle assembly for a wheel and an associated axle, and more particularly to such an assembly having a hub filled with a liquid lubricant, wherein the hub is fitted with a pressure-reducing cap to retain the liquid lubricant therein.

BACKGROUND OF THE INVENTION

A hub-spindle assembly for a rotatable wheel and an associated stationary axle generally comprises, a hub, a spindle and one or more wheel bearings. The hub is a structure at the center of the wheel that houses the wheel bearings and the spindle. The spindle extends from the end of the axle into the hub and the wheel bearings are positioned between the spindle and hub to provide a friction-reduced surface therebetween as the hub and wheel rotate about the stationary spindle and axle. The hub encloses a chamber, within which the wheel bearings and spindle are housed. The chamber contains a viscous lubricant that lubricates the bearings of the hub-spindle assembly during rotational operation of the wheel.

A cap is typically provided over the front of the hub to seal the chamber from the external environment preventing the intrusion of contaminants therein, such as grit or moisture. Such contaminants can damage or accelerate wear of the bearings within the hub-spindle assembly, thereby diminishing the life of the bearings and necessitating frequent replacement, or in some cases causing failure of the assembly during operation with potentially catastrophic results. The cap is typically removable, however, to facilitate access to the interior of the lubricant chamber for inspection, servicing or replacement of the lubricant or assembly components.

The above-described hub-spindle assembly is conventional to virtually all types of conveyances employing rotatable wheels and stationary axles, including motor vehicles and trailers. However, there are specific operational requirements for marine trailers used to transport boats, jet skis, and the like that dictate unique design features for the attendant hub-spindle assemblies. In particular, marine trailers must be capable of frequent and sustained immersion in water when launching or loading water craft. Accordingly, the hub-spindle assembly, and specifically the lubricant chamber of the hub, must be impervious to water intrusion, which as noted above, undesirably promotes damage and wear of the assembly components.

Certain hub-spindle assemblies known in the art are designed specifically to obviate the problem of water intrusion into the lubricant chamber of marine trailers. For example, U.S. Pat. No. 5,054,859 discloses a hub, wherein a grease lubricant contained within the lubricant chamber is pressurized against the walls of the lubricant chamber by means of a cap having a spring-biased, slidable piston positioned therein. The cap permits expansion or contraction of the grease lubricant within the lubricant chamber as the temperature of the grease lubricant changes during operation of the hub-spindle assembly, thereby eliminating voids within the lubricant chamber that facilitate water intrusion. The outward pressure of the grease lubricant relative to the lubricant chamber also opposes the inward water pressure providing a positive resistive force against water intrusion into the lubricant chamber.

Despite the widespread use of grease lubricant-containing hubs in marine trailers, liquid lubricants are generally known to be more effective lubricating agents than grease lubricants in hub-spindle assembly applications. Liquid lubricants exhibit improved heat transfer properties relative to grease, thereby more effectively transferring heat away from the hub-spindle assembly during operation. In addition, Commercial-grade liquid lubricants usually contain a lower level of particulates than commercial-grade grease lubricants. Consequently, a hub-spindle assembly lubricated with a liquid lubricant tends to exhibit a slower rate of wear than one lubricated with a grease lubricant under equivalent operating conditions. The proliferation of grease lubricant-containing hubs is, however, attributable to the fact that liquid lubricant-containing hubs are operationally more problematic than grease lubricant-containing hubs. For example, liquid lubricant-containing hubs are often more prone to lubricant leakage and water intrusion during operation than grease lubricant-containing hubs. Conventional liquid lubricants are typically petroleum-based oils that are rendered less effective as lubricants when contaminated with water because their hydrophobic character renders them relatively insoluble in water.

U.S. Pat. No. 5,303,800 discloses a liquid lubricant-containing hub that obviates the problem of water intrusion. A hydrophilic liquid selected from among the glycols is used as the lubricant because it is relatively viscous yet is relatively solvent in water. The solubility of the selected glycol enables it to remain fully effective as a lubricant, even when contaminated with a substantial volume of water. The liquid lubricant-containing hub disclosed therein is further provided with an expandable bellows formed from a stretchable elastomeric material that encloses a portion of the lubricant chamber and permits expansion of the liquid lubricant within the chamber during operation of the hub-spindle assembly.

Operation of the liquid lubricant-containing hub disclosed in U.S. Pat. No. 5,303,800 has inherent problems, however. In particular, the lubricant chamber is only filled to about 20% of capacity with the liquid lubricant so that the bellows is maintained in a neutral position when the hub-spindle assembly is at rest. The centrifugal force created by rotation of the wheel during operation of the hub-spindle assembly is relied upon to distribute the liquid lubricant to the upper portions of the bearings that are not in contact with the liquid lubricant when the assembly is at rest. Unfortunately, marine trailers often have only seasonal usage and remain in storage for extended periods of nonuse. During such periods of nonuse, the exposed upper portions of the bearings not contacted by the liquid lubricant are susceptible to rust which is extremely deleterious to the future operability of the hub-spindle assembly.

Additionally, the elastomeric bellows obscure visual access to the lubricant chamber, thereby hindering visual inspection of the liquid lubricant level in the lubricant chamber. Consequently, leakage of liquid lubricant from the hub may go undetected resulting in unacceptably low lubricant levels for operation of the hub-spindle assembly. Finally, it is noted that glycols are not conventional lubricants and as such may be costly or difficult to obtain, particularly in remote locales of operation.

Accordingly, it is an object of the present invention to provide a capped hub that overcomes the problems encountered with prior art hubs such as described above. More particularly, it is an object of the present invention to provide a capped hub that employs a conventional liquid hydrocarbon lubricant. It is another object of the present invention to provide a capped hub employing a liquid lubricant that fully contacts the wheel bearings retained in the hub when the hub is at rest and in rotational operation. It is yet another object of the present invention to provide such a capped hub that has specific utility to marine trailers.

It is a further object of the present invention to provide a cap for a hub that accommodates expansion of the liquid lubricant contained within the hub. It is still a further object of the present invention to provide a cap for a hub that is resistant to intrusion of water or other contaminants into the lubricant chamber of the hub. It is yet a further object of the present invention to provide a cap for a hub that enables visual inspection of the liquid lubricant within the lubricant chamber of the hub without removal of the cap. It is another object of the present invention to provide a cap for a hub that is readily removable to provide access to the interior of the hub for servicing thereof. It is still another object of the present invention to provide a cap for a hub that is sufficiently sturdy to withstand rigorous operation. These objects and others are accomplished in accordance with the invention described hereafter.

SUMMARY OF THE INVENTION

The present invention is a hub-spindle assembly for a rotatable wheel and an associated stationary axle. The assembly has a hub, a spindle and at least one wheel bearing. The hub is positioned at the center of the wheel and has a forward aperture, a rearward aperture and an open axial passageway extending between the forward and rearward apertures. The sides of the axial passageway are bounded by an interior hub surface. The spindle is an elongated member affixed to one end of the axle that is received through the rearward aperture and extends into the axial passageway of the hub. The wheel bearing is engagingly positioned between the spindle and interior hub surface within the axial passageway.

The hub has a removable cap fitted over its forward aperture. The cap comprises a hollow open-ended barrel having a slidable piston maintained therein. The barrel is fully enclosed around its circumference by a continuous lateral wall that, in association with the piston, defines an interior cavity. The barrel has a forward opening and a rearward opening at each end of the interior cavity. The rearward opening is sealably press fitted into the forward aperture of the hub, providing fluid communication between the interior cavity of the cap and the axial passageway of the hub. The piston is extendable through the forward opening of the barrel, sealably and slidably engaging the inside of the lateral wall of the barrel, thereby preventing fluid communication between the interior cavity and the environment external to the hub-spindle assembly across the forward opening.

The barrel and piston are both formed from rigid, sturdy materials. The material of the barrel, however, generally requires greater structural integrity than that of the piston because the outer surface of the barrel has greater exposure to the external environment than the outer surface of the piston during operation of the hub-spindle assembly. The material of the piston is preferably transparent enabling visual access to the interior cavity of the cap from the external environment without requiring removal of the piston. High-strength transparent plastics generally satisfy the material requirements of the piston, whereas corrosion-resistant, durable metals such as stainless steel generally satisfy the material requirements of the barrel.

The interior cavity of the cap in combination with the axial passageway of the hub defines a substantially continuous lubricant chamber housing the wheel bearing and spindle. The portions of the lubricant chamber not occupied by the wheel bearing, spindle, and associated structure constitute the fluid volume of the lubricant chamber. When the hub-spindle assembly is at rest, the fluid volume of the lubricant chamber is filled in its entirety with a liquid lubricant eliminating all void spaces within the lubricant chamber and fully immersing the wheel bearing and spindle housed therein. The liquid lubricant is preferably a conventional hydrocarbon lubricant.

When the hub-spindle assembly is in rotational operation, the lubricant chamber remains filled in its entirety with a liquid lubricant free of any void spaces. However, the liquid lubricant typically expands during rotational operation of the assembly due to heat buildup. Accordingly, the cap is provided with means for reducing the fluid pressure within the lubricant chamber without loss of the liquid lubricant by enabling expansion of the lubricant chamber. The pressure reducing means comprises a spring positioned between the barrel and piston external to the lubricant chamber that operates in cooperation with the slidable piston. When the hub-spindle assembly is at rest, the spring slidably biases the piston rearward against a stop fitted to the inside wall of the barrel. When the assembly is rotationally operating, the temperature of the assembly increases, heating the liquid lubricant and causing it to expand. The expanded lubricant slidably urges the piston forward away from the stop against the force of the spring to correspondingly expand the fluid volume of the lubricant chamber and reduce the fluid pressure therein while avoiding the formation of void spaces.

The hub has a covered lubricant port extending therethrough that penetrates its interior surface to enable selective fluid communication between the axial passageway and the external environment. When uncovered, the lubricant port permits addition or withdrawal of the liquid lubricant from the lubricant chamber as desired, typically during maintenance of the hub-spindle assembly. However, the lubricant port is generally maintained covered during operation or storage of the hub-spindle assembly. The hub is further provided with a rearward seal in its rearward aperture that sealingly fits into the annular opening formed between the aperture and the spindle where the spindle extends into the axial passageway. The rearward seal prevents fluid communication between the lubricant chamber and the external environment across the rearward aperture.

The present invention will be further understood, both as to its structure and operation, from the accompanying drawings, taken in conjunction with the accompanying description, in which similar reference characters refer to similar parts.

BRIEF DESCRIPTION OF THE DRAWINGS

FIG. 3 is an exploded perspective view of the pressure-reducing cap of the present invention.

FIG. 4 is a view of the pressure-reducing cap of FIG. 3 as seen from the rear.

FIG. 5A is a cross-sectional view of the pressure-reducing cap of FIG. 3, wherein the piston of the cap is in a neutral rearward position.

FIG. 5B is a cross-sectional view of the pressure-reducing cap of FIG. 3, wherein the piston of the cap is in an expanded forward position.

DESCRIPTION OF PREFERRED EMBODIMENTS

Figure 1:
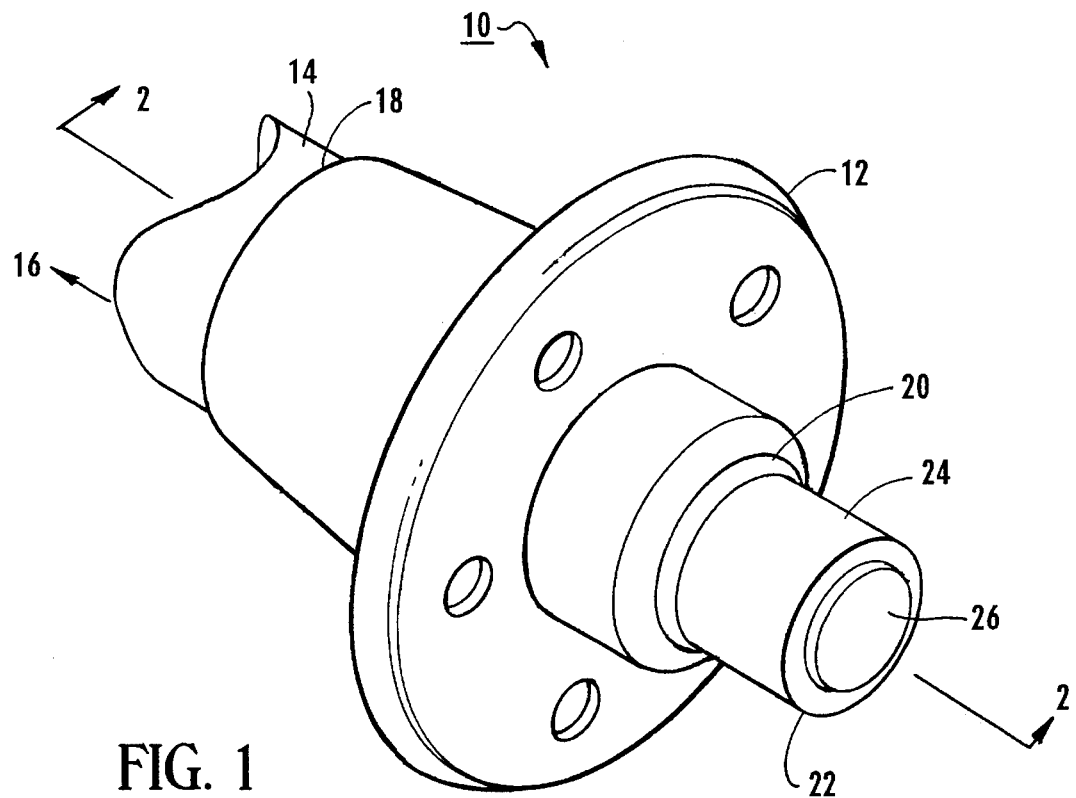
FIG. 1 is a perspective view of a hub-spindle assembly of the present invention having a pressure-reducing cap.

Referring initially to FIG. 1, a hub-spindle assembly of the present invention is shown and generally designated 10. The hub-spindle assembly 10 comprises a hub 12 and a spindle 14. The hub 12 is the central structure of a wheel (not shown) and the spindle 14 is a shaft rearwardly extending, as denoted by the directional arrow 16, to engage an end of a stationary axle (not shown) about which the wheel and hub 12 are rotatable. The hub 12 and spindle 14 are typically fabricated from strong, durable metals such as cast iron or steel. The spindle 14 forwardly extends into the hub 12 through a rearward aperture 18 in the hub 12. The hub 12 additionally has a forward aperture 20 covered by a cap 22 fitted therein. The term "rearward" is used herein to define a direction toward the axle and the term "forward" is used herein to define a direction away from the axle.

The cap 22 includes a substantially hollow, tube-shaped barrel 24 and a substantially hollow, cup-shaped piston 26 slidably positioned within the barrel 24. The piston 26 is preferably formed from a rigid, strong material having transparent properties, such as a high-strength, transparent plastic, and more preferably a molded polycarbonate plastic. The term "transparent" as used herein refers to materials that are substantially clear or translucent, to the extent a conventional liquid lubricant is visible therethrough. The barrel 24 is likewise preferably formed from a rigid, strong material. The material of the barrel 24 does not require transparent properties, yet preferably has a higher degree of structural integrity relative to the material of the piston 26, such as steel, and more preferably stainless steel.

Figure 2:
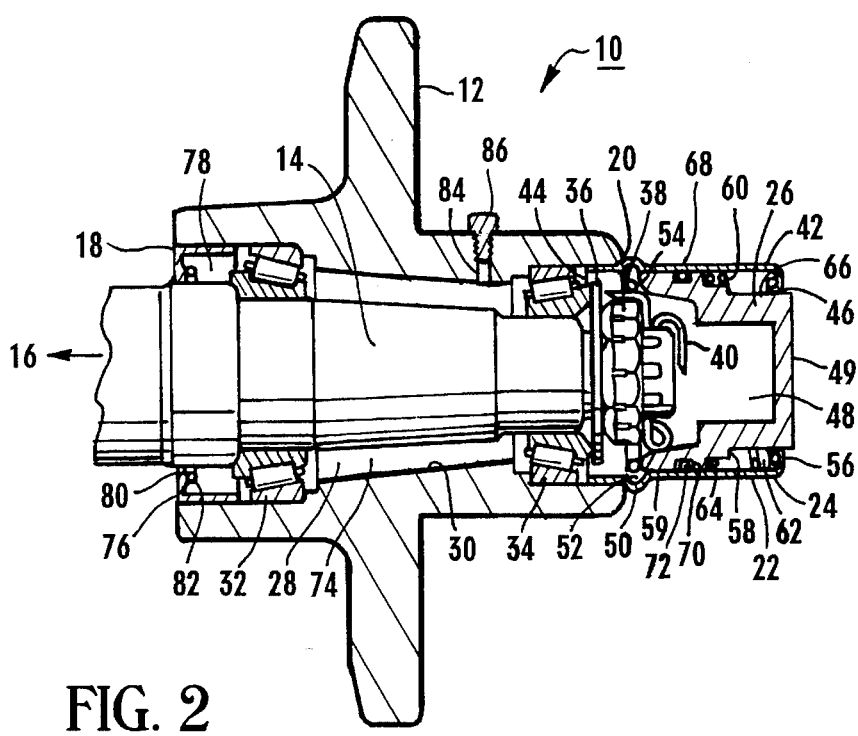
FIG. 2 is an elevational view in partial cross-section of the hub-spindle assembly of FIG. 1 taken along line 2—2.

Referring to FIG. 2, the hub 12 of the hub-spindle assembly 10 encloses an open, substantially cylindrical axial passageway 28 extending between the rearward aperture 18 and the forward aperture 20 of the hub 12. The axial passageway 28, which is bounded by an interior hub surface 30, houses the spindle 14, although the spindle 14 is substantially free from contact with the interior hub surface 30. The axial passageway 28 further houses a pair of bearings, including a rearward bearing 32 and a forward bearing 34. The rearward and forward bearings 32, 34 are conventional wheel bearings well known to the skilled artisan. As such, the rearward and forward bearings 32, 34 are positioned between the hub 12 and spindle 14 to provide a friction-reduced contact surface therebetween as the hub 12 rotates about the stationary spindle 14. The hub 12, spindle 14, and bearings 32, 34 are maintained in cooperative positional relationship within the assembly 10 by means of a spindle washer 36, a spindle nut and retainer 38, and a cotter pin 40, which are conventional and well known to the skilled artisan.

The barrel 24 of the cap 22 has a cylindrical lateral wall 42 aligned with the axis of the barrel 24, a rearward opening 44 and a forward opening 46. The lateral wall 42, in combination with the piston 26, defines a single continuous interior cavity 48 extending axially within the cap 22 from the rearward opening 44 of the barrel 24 to a closed forward end 49 of the piston 26 that is positionable in and extendable through the forward opening 46 of the barrel 24. The closed forward end 49 of the piston 26 has a substantially flat disk shape and is transparent, enabling visual access into the interior cavity 48 across the forward opening 46. The outside surface of the forward end 49 is in direct contact with the external environment of the hub-spindle assembly 10, while the inside surface of the forward end 49 is in direct contact and continuous fluid communication with the interior cavity 48 of the cap 22 free from any continuous or discontinuous intervening partitions that could impair continuous fluid communication between the forward end 49 and the interior cavity 48 or impair viewing of the interior cavity 48 from the external environment. The rearward end of the piston 26 remains open.

The lateral wall 42, rearward opening 44 and forward aperture 20 are sized to enable press fitting of the barrel 24 into the forward aperture 20, thereby providing a removable fluid-tight seal at the joint between the cap 22 and the hub 12 while further providing fluid communication between the interior cavity 48 and axial passageway 28. A rearward annular rib 50 is formed in the outside of the lateral wall 42, limiting entry of the barrel 24 into the forward aperture 20 of the hub 12. The rearward annular rib 50 correspondingly forms a rearward annular groove 52 in the inside of the lateral wall 42, in which a split ring 54 is lodged to provide a limiting abutment for rearward travel of the piston 26 within the barrel 24.

A forward abutment 56 is formed by an inward bend in the lateral wall 42 adjacent to the forward opening 46 limiting forward travel of the piston 26 within the barrel 24 when the forward abutment 56 is engaged by an inner step 58 formed on the cylindrical outer lateral surface 59 of the piston 26. The forward abutment 56 also receives and retains one end of a stainless steel compression coil spring 60 that is disposed in a spring chamber 62 formed between the piston 26 and the inside of the lateral wall 42. The opposite end of the compression coil spring 60 is abuttingly positioned against an outer step 64 formed on the outer lateral surface 59 of the piston 26 rearward of the inner step 58. The compression coil spring 60 acts to bias the piston 26 to a neutral rearward position wherein the piston abuts the split ring 54.

The inner and outer steps 58, 64 formed in the outer lateral surface 59 of the piston 26 segment the lateral surface 59 into a forward stage 66 and a rearward stage 68, respectively. The forward stage 66 has a substantially smaller diameter than the rearward stage 68. The diameter of the forward stage 66 is approximately equal to, but slightly smaller than, the diameter of the forward opening 46 enabling close slidable engagement between the forward stage 66 and the forward abutment 56. The diameter of the rearward stage 68 is approximately equal to, but slightly smaller than, the inner diameter of the lateral wall 42 enabling close slidable engagement between the rearward stage 68 and the lateral wall 42. An annular groove 70 is formed in the rearward stage 68 to receive and retain an O-ring 72 that provides a fluid tight seal between the barrel 24 and piston 26 preventing fluid communication between the interior cavity 48 and the external environment of the hub-spindle assembly 10 across the forward opening 46.

The interior cavity 48, in combination with the axial passageway 28, defines a substantially continuous lubricant chamber 74. The lubricant chamber 74 has a fluid volume defined by the portion of the chamber 74 that is unoccupied by structural components housed therein, including the spindle 14, rearward and forward bearings 32, 34, and associated components 36, 38, 40. The lubricant chamber 74 is maintained in fluid isolation from the external environment of the hub-spindle assembly 10 across the forward opening 46 by means described above and across the rearward aperture 18 by a rearward seal 76. The rearward seal 76 has an annular configuration to sealingly fit into the annular opening 78 formed between the hub 12 and spindle 14 where the spindle 14 extends through the rearward aperture 18 into the axial passageway 28. The rearward seal 76 comprises an elastomeric lip 80 that fits tightly against the spindle 14 to prevent the leakage of fluid therebetween. The tight fit is maintained by a circular spring 82 circumscribing the lip 80 and biasing the lip 80 against the spindle 14. An alternate configuration of the rearward seal (not shown) can be substituted for the rearward seal 76 of FIG. 2, wherein the alternate configuration comprises a plurality of elastomeric lips, each substantially similar to the lip 80 of FIG. 2. By providing a rearward seal having a plurality of lips, rather than a single lip, the risk of fluid leakage between the seal and spindle is further reduced.

Although not shown in FIG. 2, the fluid volume of the lubricant chamber 74 is filled in its entirety with a liquid lubricant prior to operation of the hub-spindle assembly 10 such that the operable hub-spindle assembly 10 has no void spaces within the lubricant chamber 74. A void space is defined herein as a space in the fluid volume free of the liquid lubricant. A liquid lubricant is generally defined as a lubricant that flows under the force of gravity at ambient temperature, whereas a grease does not flow under the force of gravity at ambient temperature. The liquid lubricant employed herein is preferably a conventional hydrocarbon lubricant such as a grade SAE 85/95 gear and bearing oil. At all times, the spindle 14 and bearings 32, 34 housed within the lubricant chamber 74 are fully immersed in the liquid lubricant. A selectively openable lubricant port 84 is provided in the hub 12 comprising a threaded opening penetrating the interior surface 30 of the hub 12. The lubricant port 84 enables selective fluid communication between the axial passageway 28 and the external environment of the hub-spindle assembly 10 to permit addition or withdrawal of the liquid lubricant from the lubricant chamber 74 as desired. During operation of the assembly 10, a threaded plug 86 fabricated from a sturdy metal such as steel is positioned in the port 84 to maintain the port 84 closed and prevent fluid leakage therefrom.

The configuration of the cap 22, as described above with reference to FIGS. 1 and 2, is shown in greater detail with reference to FIGS. 3 and 4. The split ring 54 is shown therein to have a pentagonal configuration, although other geometric configurations of the split ring 54 are apparent to the skilled artisan within the scope of the present invention.

Operation of the cap 22 is described hereafter with reference to FIGS. 5A and 5B. For purposes of clarity, other cooperative components of the hub-spindle assembly 10 as described above are not shown herein, but it is understood that the cap 22 is operable in cooperation with such components. It is further noted that the interior cavity 48 of the cap 22 as shown in FIGS. 5A and 5B is in its operable state completely filled with a liquid lubricant 88. Although the remainder of the lubricant chamber is not shown, i.e., the axial passageway of the hub, it is understood that the operable axial passageway is likewise completely filled in its entirety with the liquid lubricant 88 in correspondence with the interior cavity 48.

Referring initially to FIG. 5A, the cap 22, and in particular the piston 26, is shown in a neutral rearward position. As such, the spring 60 is only slightly compressed to bias the piston 26 in a fully retracted position within the barrel 24 in abutment with the split ring 54. This position of the piston 26 corresponds to a period when the liquid lubricant 88 is at a relatively low ambient temperature such as during storage or initial start-up operation of the hub-spindle assembly, or when the plug is removed from the lubricant port during maintenance of the hub-spindle assembly for the purpose of adding or withdrawing liquid lubricant 88 therefrom.

Referring to FIG. 5B, the cap 22, and in particular the piston 26, is shown in an expanded forward position. As such, the spring 60 is substantially more compressed and the piston 26 is fully extended from the barrel 24 against the forward abutment 56. This position of the piston 26 corresponds to a period when the liquid lubricant 88 has been heated by the surrounding components of the hub-spindle assembly to a relatively high temperature above the ambient temperature causing the liquid lubricant 88, and correspondingly the interior cavity 48, to expand, such as during continuous operation of the hub-spindle assembly. It is noted that although the volume of the lubricant chamber and the liquid lubricant 88 contained therein typically expands during normal operation of the hub-spindle assembly, the mass of the material contained within the lubricant chamber remains substantially constant because matter is not added to or lost from the lubricant chamber during normal operation of the assembly. However, should the lubricant chamber experience any lubricant loss during operation or storage of the assembly due to a malfunction, such as leakage, the declining level of the liquid lubricant 88 within the lubricant chamber will be visibly evident to the operator through the transparent forward end 49 of the piston 26. Accordingly, the operator will have sufficient warning to add fresh liquid lubricant to the lubricant chamber, or otherwise service the hub-spindle assembly, before the assembly is substantially damaged.

While the forgoing preferred embodiments of the invention have been described and shown, it is understood that alternatives and modifications, such as those suggested and others, may be made thereto and fall within the scope of the invention.

I claim:

1. A cap for retaining a liquid lubricant within a wheel hub, said cap comprising:

a hollow barrel having a forward opening, a rearward opening and a piston engagement surface forward of said rearward opening;

a substantially rigid piston having a closed forward end sealed to fluid flow therethrough and a barrel engagement surface positioned within said barrel and slidably engaging said piston engagement surface;

a substantially continuously forwardly enclosed interior cavity defined by said barrel and said piston, said interior cavity axially extending from said rearward opening to said forward end of said piston and maintaining substantially continuous fluid communication with said forward end, wherein said interior cavity has a variable fluid volume in response to the slidable position of said piston within said barrel;

a non-grease liquid lubricant positioned within said variable fluid volume; and a substantially continuous seal positioned at said piston and barrel engagement surfaces, thereby preventing flow of said non-grease liquid lubricant between said piston and barrel engagement surfaces throughout slideable engagement of said piston and barrel engagement surfaces.

2. A cap as recited in claim 1 wherein said liquid lubricant substantially fills the entirety of said variable fluid volume.

3. A cap as recited in claim 1 wherein said forward end of said piston is substantially transparent and said interior cavity is visually accessible through said forward end.

4. A cap as recited in claim 1 wherein said interior cavity is substantially free of any intervening partitions between said rearward opening of said barrel and said forward end of said piston.

5. A cap as recited in claim 1 wherein said barrel has a substantially continuous lateral wall free of any openings.

6. A cap as recited in claim 1 wherein said piston is substantially hollow having a lateral surface extending rearwardly from said forward end.

7. A cap as recited in claim 1 wherein said forward end of said piston is extendable through said forward opening of said barrel.

8. A hub-spindle assembly comprising:
   a hub having a forward aperture, a rearward aperture and an axial passageway extending between said forward aperture and said rearward aperture and bordered by an interior surface;
   a spindle received through said rearward aperture and extending into said axial passageway;
   a bearing positioned within said axial passageway between said spindle and said interior surface;
   a cap including a hollow barrel having a forward opening, a rearward opening and a piston engagement surface forward of said rearward opening, said cap further including a substantially rigid piston having a closed forward end sealed to fluid flow therethrough and a barrel engagement surface positioned within said barrel and slidably engaging said piston engagement surface, wherein said cap sealingly engages said hub, such that said cap defines a continuously forwardly enclosed interior cavity in fluid communication with said axial passageway, said axial passageway and said interior cavity forming a continuous lubricant chamber having a variable fluid volume in response to the slidable position of said piston within said barrel;
   a non-grease liquid lubricant positioned within said variable fluid volume; and
   a substantially continuous seal positioned at said piston and barrel engagement surfaces, thereby preventing flow of said non-grease liquid lubricant between said piston and barrel engagement surfaces throughout slideable engagement of said piston and barrel engagement surfaces.

9. A hub-spindle assembly as recited in claim 8 wherein said liquid lubricant substantially fills the entirety of said variable fluid volume.

10. A hub-spindle assembly as recited in claim 8 further comprising a lubricant port penetrating said interior surface of said hub providing selective fluid communication between said axial passageway and the environment external to said axial passageway.

11. A hub-spindle assembly as recited in claim 8 wherein said forward end of said piston is substantially transparent and said lubricant chamber is visually accessible through said forward end.

12. A hub-spindle assembly as recited in claim 8 wherein said interior cavity is substantially free of any intervening partitions between said rearward opening of said barrel and said forward end of said piston.

13. A hub-spindle assembly as recited in claim 8 wherein said barrel has a substantially continuous lateral wall free of any openings.

14. A hub-spindle assembly as recited in claim 8 wherein said piston is substantially hollow having a lateral surface extending rearwardly from said forward end.

15. A hub-spindle assembly as recited in claim 8 further comprising a rearward seal positioned rearward of said bearing between said spindle and said interior surface blocking fluid communication between said axial passageway and the environment external to said axial passageway, wherein said seal has at least one elastic lip engaging said spindle.

16. A hub-spindle assembly as recited in claim 8 wherein said forward end of said piston is extendable through said forward opening of said barrel.

17. A method for lubricating a bearing of a hub-spindle assembly comprising:
   providing a hub-spindle assembly including a spindle, a bearing and a hub, said hub having a forward aperture, a rearward aperture and an axial passageway bordered by an interior surface extending between said forward aperture and said rearward aperture;
   receiving said spindle through said rearward aperture into said axial passageway;
   positioning said bearing within said axial passageway between said spindle and said interior surface;
   providing a cap sealingly engaging said hub, said cap including a substantially rigid piston and a hollow barrel having a forward opening and a rearward opening;
   slidably and sealably positioning said piston within said barrel, wherein said piston and barrel define an interior cavity in fluid communication with said axial passageway, said interior cavity and axial passageway forming a continuous lubricant chamber having a fluid volume, and wherein said piston substantially blocks fluid communication between said forward opening and the environment external to said assembly;
   placing a liquid lubricant in said fluid volume and substantially sealing said lubricant chamber to the environment; and
   slidably displacing said piston within said barrel in response to expansion or contraction of said liquid lubricant, thereby varying said fluid volume.

18. A method for lubricating a bearing as recited in claim 17 wherein said liquid lubricant substantially fills the entirety of said fluid volume.

19. A method for lubricating a bearing as recited in claim 17 wherein said liquid lubricant in said fluid volume substantially blocks entry of contaminants from the environment into said lubricant chamber.

20. A method for lubricating a bearing as recited in claim 17 wherein the mass of the contents of said lubricant chamber remains substantially constant as said fluid volume varies.

* * * * *